US012769563B2

(12) United States Patent
Abidi

(10) Patent No.: US 12,769,563 B2
(45) Date of Patent: Oct. 20, 2026

(54) TECHNIQUES FOR CONFIGURING AND UPDATING SOFTWARE AND APPLICATIONS ON STALLED ON DEVICES COMMUNICATING WITH ONE OR MORE SERVERS

(71) Applicant: STREAMWIDE, Paris (FR)

(72) Inventor: Soufien Abidi, Tunis (TN)

(73) Assignee: STREAMWIDE, Paris (FR)

( * ) Notice: Subject to any disclaimer, the term of this patent is extended or adjusted under 35 U.S.C. 154(b) by 134 days.

(21) Appl. No.: 18/854,130

(22) PCT Filed: Apr. 5, 2023

(86) PCT No.: PCT/EP2023/058942
§ 371 (c)(1),
(2) Date: Oct. 4, 2024

(87) PCT Pub. No.: WO2023/208550
PCT Pub. Date: Nov. 2, 2023

(65) Prior Publication Data
US 2025/0245024 A1 Jul. 31, 2025

(30) Foreign Application Priority Data
Apr. 26, 2022 (FR) ....................................... 2203891

(51) Int. Cl.
*G06F 9/445* (2018.01)

(52) U.S. Cl.
CPC ................................ *G06F 9/44505* (2013.01)

(58) Field of Classification Search
CPC ........ G06F 9/445; G06F 9/44505; G06F 8/65; G06F 11/3668
See application file for complete search history.

(56) References Cited

U.S. PATENT DOCUMENTS 10,783,235 B1 * 9/2020 Agarwal ................. G06F 21/45
10,891,140 B1 * 1/2021 Levin .................. G06F 9/45533
2002/0188701 A1 * 12/2002 Brown ................ G06F 9/44505 713/100

(Continued)

OTHER PUBLICATIONS

International Search Report issued on May 23, 2023, in corresponding International Application No. PCT/EP2023/058942; 5 pages.

*Primary Examiner* — Raymond N Phan
(74) *Attorney, Agent, or Firm* — Maier & Maier, PLLC

(57) ABSTRACT

A system including a terminal (1) and a server (2) which are configured for the following, when a communication session is opened: sending, from the terminal to the server, a set of identifiers; comparing it to the content of a database, and in the event of an exact match, continuing the communication session without updating the configuration of the terminal; in the event of a partial match, sending in return an associated configuration file; in the event of no match, identifying a pair of similar identifiers and sending an associated configuration file tagged with a temporary indicator; populating the database with the received set and any association resulting from the identification; upon receipt of the file, implementing it in a front-end application of the terminal, and if and only if said configuration file contains an indicator tagging the file as temporary, switching the front-end application to a test mode.

9 Claims, 3 Drawing Sheets

(56) References Cited

U.S. PATENT DOCUMENTS

| | | | | |
|---|---|---|---|---|
| 2009/0319848 | A1 | 12/2009 | Thaper | |
| 2010/0333081 | A1* | 12/2010 | Etchegoyen | G06F 8/60 717/172 |
| 2012/0110142 | A1* | 5/2012 | Montagna | G06F 8/71 709/220 |
| 2014/0317613 | A1 | 10/2014 | Appiah et al. | |
| 2015/0134944 | A1* | 5/2015 | Zhang | G06F 9/4415 713/2 |
| 2021/0200557 | A1* | 7/2021 | Coelho | H04L 67/34 |
| 2022/0066766 | A1* | 3/2022 | Mysore Shantamurthy | G06F 9/4416 |
| 2024/0028660 | A1* | 1/2024 | Xing | H04L 67/34 |

* cited by examiner

TECHNIQUES FOR CONFIGURING AND UPDATING SOFTWARE AND APPLICATIONS ON STALLED ON DEVICES COMMUNICATING WITH ONE OR MORE SERVERS

TECHNICAL FIELD

This disclosure relates to the field of techniques for configuring and updating software and applications installed on devices communicating with one or more servers. It is aimed more particularly at situations where the fleet of devices includes devices having a variety of internal software ("firmware") that is initially unknown from the servers' point of view.

BACKGROUND

In the field of software application maintenance, the responsibility for updates rests almost exclusively with the provider of said software, typically applications installed on smartphones. However, such devices may have a wide variety of firmware which results from the wide variety of manufacturers, device models, and even versions of firmware for a same device model. From the point of view of an application provider such as the Applicant, new firmware therefore appears quite frequently. When a new firmware version appears, typically with a new terminal model, the application's operation may be degraded or even totally incompatible with the new terminal model. To maintain the application's compatibility over time with as many devices as possible, application providers regularly deploy application updates to the entire fleet of devices even if only a small fraction of them (the most recent) need such an update. Such maintenance is complex, costly, and inefficient.

SUMMARY

The present disclosure improves the situation.

A system is proposed comprising at least one terminal and a server which are capable of communicating with each other, a back-end application and a corresponding front-end application being installed respectively on the server and on the terminal, the server having access to at least one database.

The database comprises:

- a list of sets of identifiers, each set of identifiers comprising
  - a terminal identifier,
  - a hardware layer identifier, and
  - an operating system identifier;
- a lookup table mapping between
  - each pair of hardware layer identifier and operating system identifier that exists in said list, and
  - a configuration file, stored in the at least one database.

The terminal and the server are configured in coordination with each other for the following, when a communication session is opened between the terminal and the server:

a. sending, from the terminal to the server, a set of identifiers comprising a terminal identifier, a hardware layer identifier for a hardware layer of the terminal, and an operating system identifier for the operating system implemented on the terminal;

b. upon the server receiving the set of identifiers from the terminal, comparing this set with the content of the database, and

- in the event of a match between the set of identifiers sent and a set of identifiers in said list, continuing the communication session without updating the configuration of the terminal;
- in the event of no match between the set of identifiers sent and the sets of identifiers in said list, and in the event of a match with a pair of hardware layer and operating system identifiers in the lookup table, sending in return, from the server to the terminal, the configuration file associated with said pair in the lookup table;

- in the event of no match with a pair of hardware layer and operating system identifiers in the lookup table, identifying, in the lookup table and by applying pre-established rules, a pair of hardware layer and operating system identifiers which is closest to that of the set of identifiers sent from the terminal, then sending in return, from the server to the terminal, the configuration file associated with the combination identified according to the lookup table, said file being sent with an indicator tagging the configuration file as temporary;

c. populating the database with the set of identifiers received and any association resulting from the identification;

d. upon the terminal receiving a configuration file from the server, implementing said configuration file in the front-end application, and if and only if said configuration file carries an indicator tagging the file as temporary, switching the front-end application to a test mode.

The terminal and the server may further be configured for:

e. in response to a predetermined validation action by the user via the terminal, deleting an indicator tagging the file as temporary, on the terminal, switching the front-end application to a normal mode, sending, from the terminal to the server, a command to validate said temporary configuration file;

f. upon the server receiving from the terminal the command to validate the temporary configuration file, deleting an indicator tagging the file as temporary in the corresponding association in the database.

According to another aspect, a configuration method implemented by a terminal is proposed, comprising operations a and d and optionally e, above.

According to another aspect, a configuration method implemented by a server is proposed comprising operations b and c and optionally f, above.

According to another aspect, a terminal is proposed which is configured for implementing a method as defined above.

According to another aspect, a server is proposed which is configured for implementing a method as defined above.

According to another aspect, a computer program is proposed which comprises instructions for implementing all or part of a method as defined herein when this program is executed by a processor. According to another aspect, a non-transitory computer-readable storage medium is proposed, on which such a program is stored.

By providing configuration files adapted to each new terminal which connects to the server (or terminal in a new configuration), it is possible to reduce the number and frequency of full updates to the application to be deployed to all terminals. Creating a configuration file is much easier than deploying a full update, in particular because the compatibility is to be verified with the terminal or the configuration in question rather than with the entire fleet of terminals. The size of a configuration file is much smaller than that of a full update to an application, which therefore reduces the time and the hardware and software resources required to send such files via telecommunications networks and then install them. From the point of view of the terminal users, it is unnecessary to update the application as long as the terminal being used has not been modified.

From a general point of view, the providing of a new configuration file benefits each user of a terminal having the corresponding configuration, while not impacting other users of the service. Upstream, a user applying a configuration file in "test" mode verifies that it functions properly, so that intervention by an operator of the application provider is only necessary in the event of a malfunction.

BRIEF DESCRIPTION OF DRAWINGS

Other features, details and advantages will become apparent from reading the detailed description below, and from analyzing the attached drawings, in which.

DETAILED DESCRIPTION

In the following, the terms "front-end application" and "back-end application" are used to distinguish between what a technician calls the front-end and back-end respectively. Similarly, the terms "internal software" and "application software" are used to distinguish between what a technician calls "firmware" and "software" respectively.

What is described below has been implemented by the Applicant in the context of half-duplex communications via mobile telephone networks, better known by the acronym "PTT" for "Push-to-Talk", and in particular its services known under the trade names "Team on the run" and "Team on mission". In essence, this involves offering communication solutions which, from the users' point of view, seem to behave similarly to "walkie-talkie" radio transceivers (holding down a button to speak on a channel, releasing the button to stop speaking on the channel and switch to listening mode), while offering properties enabled by recent communication networks and protocols (combining audio/video; compatibility and interoperability with a large number of mobile or fixed terminals; encryption of communications; geolocation; on-the-fly network switching; etc.). In practice, the implementation of the following is therefore particularly beneficial in the context of PTT communications without being limited thereto.

The implementation of the following is also particularly advantageous in situations where physical access to the terminals and to certain information relating to their configuration is difficult, or even impossible, for the application software manager. This is typically the case for privacy and security reasons, when the terminals are used by people performing "sensitive" activities (police, law enforcement, civil security, emergency services in the event of a disaster, operations in areas where network coverage is unreliable, etc.).

DESCRIPTION OF EMBODIMENTS

Figure 1:
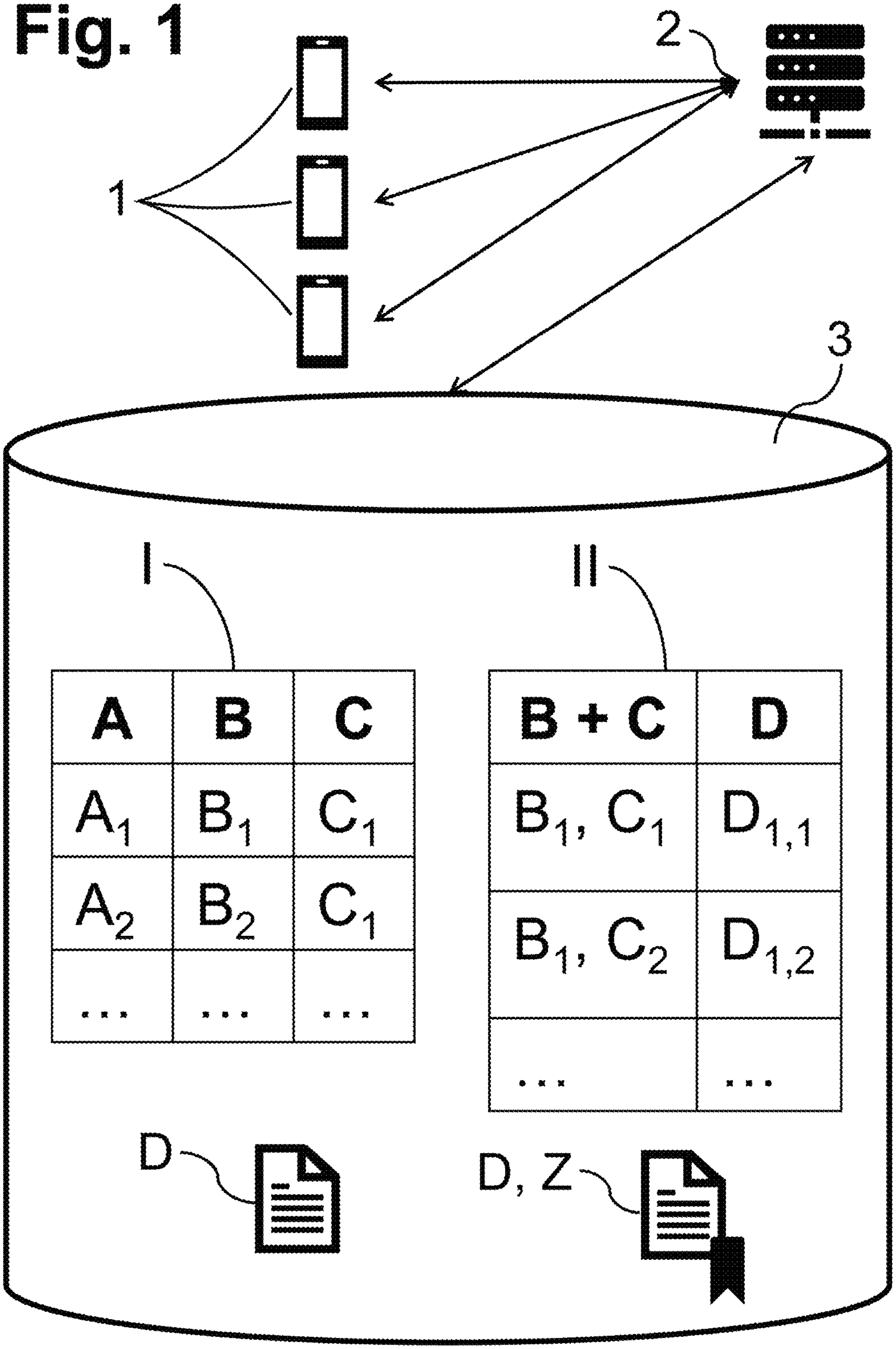
FIG. 1 represents elements of the system according to one embodiment.

Reference is now made to [FIG. 1]. A system comprises at least one terminal 1, here three, a server 2, and a database 3. Terminal 1 and server 2 are each a device adapted to communicate (i.e. exchange data) via one or more telecommunications networks, in particular with each other. Terminal 1 may thus correspond to a fixed or mobile communication device, for example a smartphone or a computer, available to a user. Server 2 designates a device that is remote from terminal 1 and is managed by a service provider such as an application provider. Database 3 is accessible to server 2. Database 3 is represented here as an entity distinct from server 2. Alternatively, database 3 is a subset of server 2. The data exchanges between terminal 1, server 2, and database 3 may involve intermediate components. In other words, the data transmissions are not necessarily direct between the aforementioned elements.

Terminal 1 comprises a human-machine interface. Human-machine interface is an expression used as a generic term to designate all devices and software components of terminal 1 that enable the user to interact with terminal 1, both for receiving information from terminal 1 and for entering information into terminal 1. The human-machine interface takes the form, for example, of a touch screen which is known per se. Alternatively, the human-machine interface may take other forms such as a microphone for capturing voice commands, a speaker for providing information in audio form, a vibrator for providing information in haptic form, or a combination of such components.

Terminal 1 comprises at least one processor and a memory unit configured so that the processor executes programs stored in the memory unit. The programs comprise:

- internal software ("firmware"), generally installed at the time of the manufacture and factory setting configuration of terminal 1, and then updated under the responsibility of the entity which markets terminal 1;
- application software ("software"), generally installed at a later time at the initiative of the user of terminal 1 and updated under the responsibility of an entity which is often different from the provider of terminal 1.

The front-end of an application is installed on terminal 1, while the back-end of the application is installed on server 2.

In the present context, server 2 may comprise several devices and software components arranged to interact with each other. In other words, server 2 does not necessarily consist of a single physical unitary device but may instead comprise several distinct modules which are remote from each other. Server 2 comprises for example at least one processor and one or more memory units capable of storing databases accessible to the at least one processor. In the example described here, server 2 further comprises an application programming interface, or API. The API interfaces between a communication module of server 2, and database 3. One or more APIs may also be provided to enable operators to access them.

Database 3 contains at least the following data:

- a list I of sets of identifiers;
- a lookup table II;
- configuration files D, optionally including one or more "temporary" configuration files denoted D, Z.

Each set of identifiers in list I comprises:

- a terminal identifier A,
- a hardware layer identifier B, and
- an operating system identifier C. In practice, list I identifies each terminal 1 that connects to server 2 with information about its hardware layer and its operating system. When a terminal 1 changes its hardware layer and/or its operating system, and then connects again to server 2, it therefore generates a new entry in list I (a new set of identifiers that is different from the set of identifiers generated during its previous connection).

Lookup table II comprises associations between:

each pair B; C of hardware layer identifier and operating system identifier which exists in list I, and a configuration file D.

Thus, list I may comprise several sets of identifiers which differ by the identifier of terminal A but have the same hardware layer identifier B and the same operating system identifier C. In this case, lookup table II comprises a single association between said pair of identifiers B; C and a configuration file D. A plurality of different terminals having a common configuration are therefore indirectly associated with a same configuration file D. This situation corresponds in practice to a fleet of similar terminals which can be configured in a similar manner.

Figure 2:
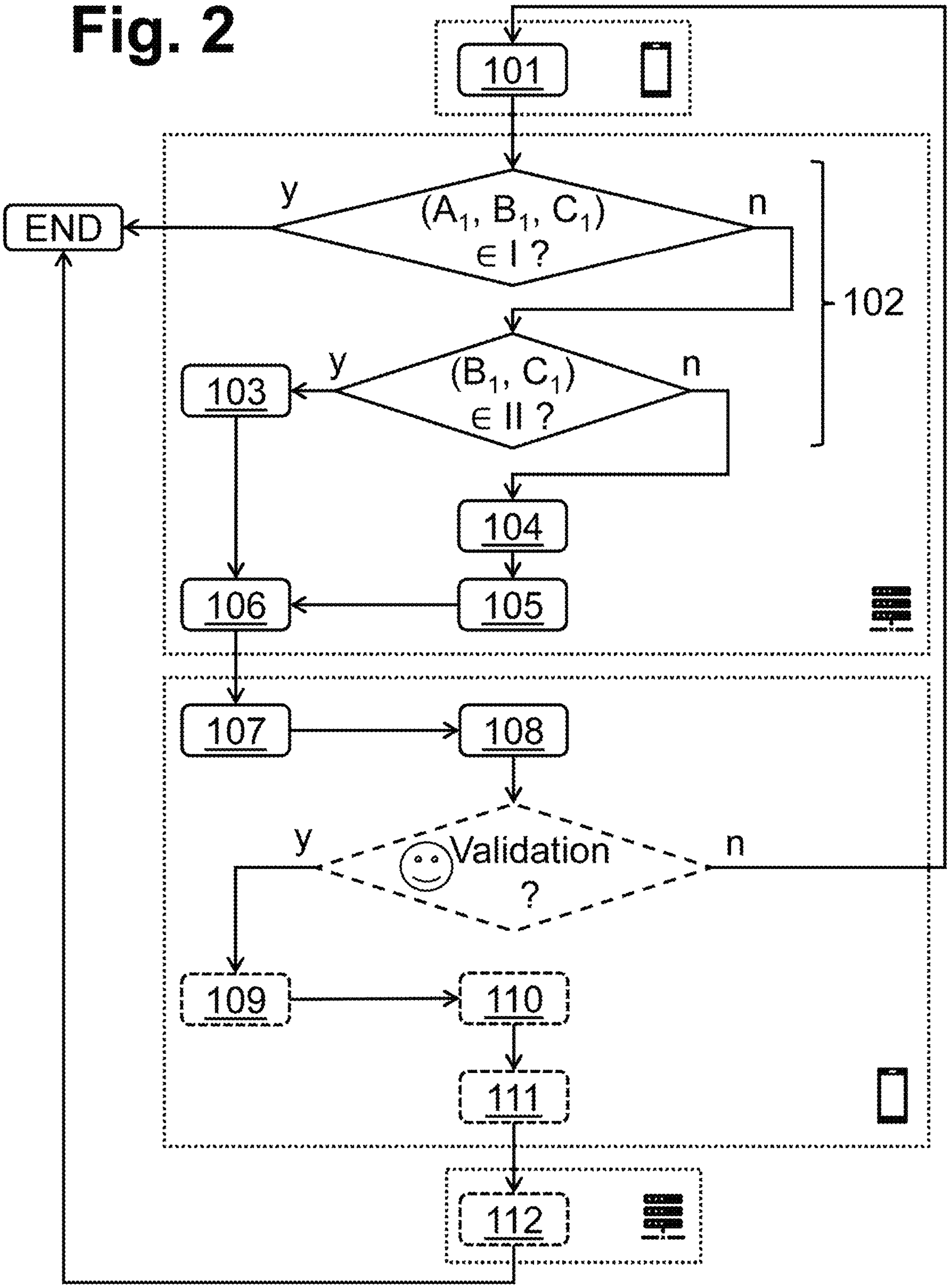
FIG. 2 is a diagram of an implementation according to one embodiment.
Figure 3:
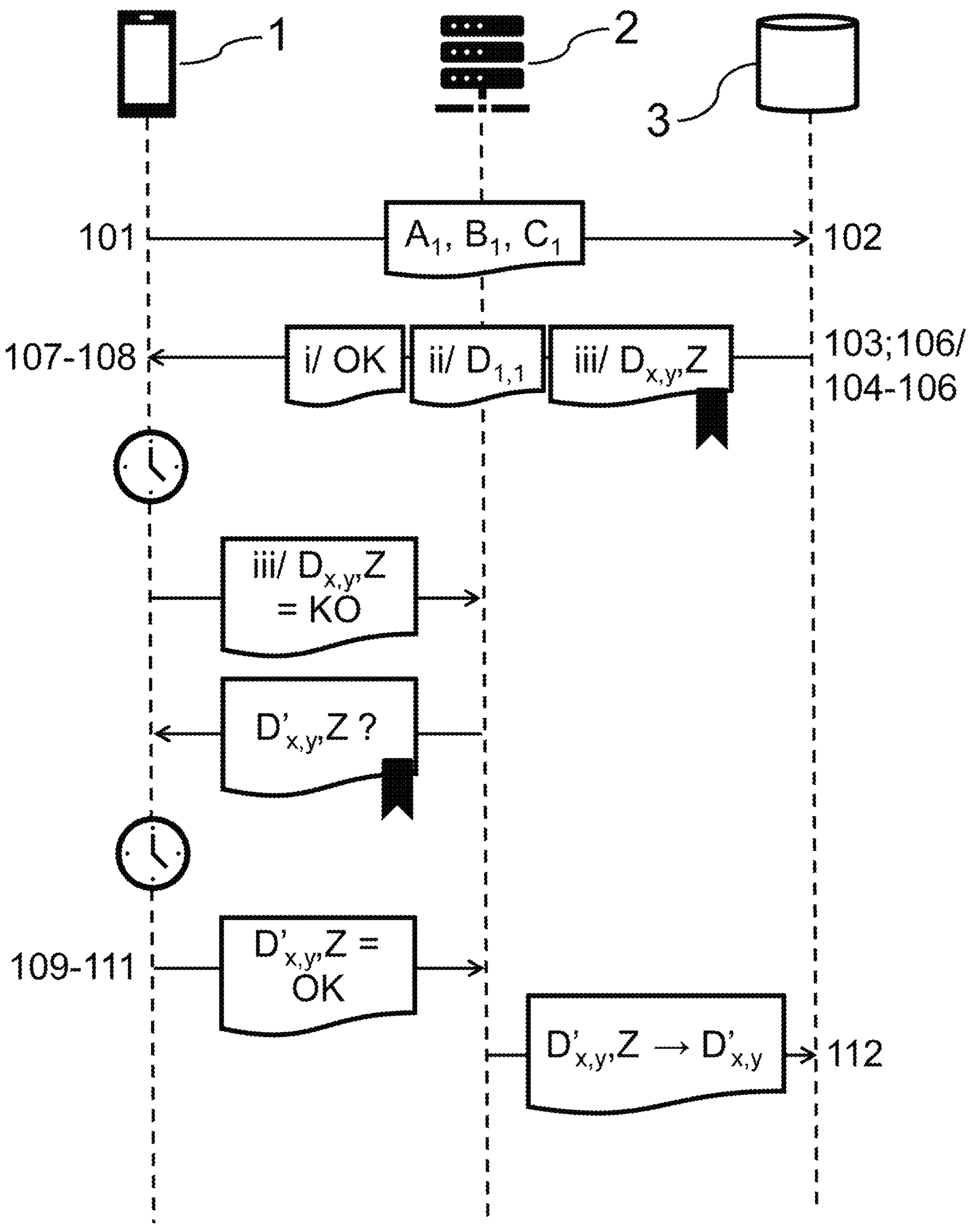
FIG. 3 represents data exchanges between elements of a system according to one embodiment.

Reference is now made to [FIG. 2] and [FIG. 3]. The at least one terminal 1 and the server 2 are configured in coordination with each other in order to carry out operations. "Coordination" is used to indicate that some operations are implemented from terminal 1 while other operations are implemented from server 2. In [FIG. 2], icons representing terminal 1 and server 2 are linked to operations in order to identify the element of the system where each operation originates, according to the embodiment described. However, for better understanding, the operations implemented are presented in chronological order, independently of the element of the system that implements it. It remains easy to break down the operations according to the element of the system that implements them, as in [FIG. 3], in order to distinctly define a method implemented by the terminal, and a method implemented by the server, tied together in such a way that they form a single general inventive concept.

In the example described here, the opening of a communication session between terminal 1 and server 2 is the element that triggers the operations described below. In other words, the configuration update is triggered by the connection of terminal 1 to server 2. Alternatively, other triggers are provided, for example an action/manipulation by the user of terminal 1 via its human-machine interface.

The methods for which terminal 1 and server 2 are configured comprise the operations described below.

A first operation 101 comprises:

a. sending a set of identifiers from the terminal to the server. The set of identifiers comprises:
   an identifier $A_1$ of terminal 1,
   a hardware layer identifier $B_1$ for a hardware layer of terminal 1, and
   an operating system identifier $C_1$ for the operating system implemented on terminal 1.

The set of identifiers $A_1$, $B_1$, $C_1$ may be sent in the form of a response to a request sent by server 2, or may be initiated by terminal 1, for example included in a request to update configuration files or a request to establish or access a communication session.

An operation 102 comprises:

b. upon server 2 receiving from terminal 1 the set of identifiers $A_1$, $B_1$, $C_1$, comparing (said set) with the content of database 3.

Different operations are implemented, depending on the results of the comparisons. In particular:

i/in the event of a match between the set of identifiers $A_1$, $B_1$, $C_1$ sent and a set of identifiers in list I, continuing the communication session without updating the configuration of terminal 1. In this case, terminal 1 in its current configuration is considered to have already connected previously to server 2 and its configuration file is therefore up to date: there is no need to update it again and the update methods may therefore be terminated and the communication session continued in a manner that is known per se.

ii/in the event of no match between the set of identifiers $A_1$, $B_1$, $C_1$ sent and the sets of identifiers in said list I, and in the event of a match with a pair $B_1$, $C_1$ of hardware layer and operating system identifiers in lookup table II, implementing an operation 103 described below.

iii/in the event of no match with a pair $B_x$, $C_y$ of hardware layer and operating system identifiers in lookup table II, implementing an operation 104 and an operation 105 which are described below.

Operation 103 comprises:

sending in return, from server 2 to terminal 1, the configuration file $D_{1,1}$ associated with said pair $B_1$, $C_1$ according to lookup table II. This situation corresponds to that of a terminal 1 which is connecting for the first time, at least in its current configuration, to server 2 (because it has never been stored in database 3 with identifiers $B_1$, $C_1$). Nevertheless, the existence of the pair of identifiers $B_1$, $C_1$ implies that a configuration file $D_{1,1}$ presumed to be adapted to such a configuration is available in database 3. This existence may result from a previous implementation of configuration file $D_{1,1}$ on server 2 by an operator and/or, for example, from a prior implementation of a method as described herein by another terminal having the same configuration ($B_1$ and $C_1$). It is then understood that the implementation of the methods described herein by a first terminal then benefits terminals having similar configurations.

At the end of operation 103, the methods may continue by implementing operations 106 and/or 107 described below.

Operation 104 comprises:

identifying, in lookup table II and by applying pre-established rules, a pair $B_x$, $C_y$ of hardware layer and operating system identifiers which is closest to that of the set of identifiers $B_1$, $C_1$ sent from terminal 1.

The pre-established rules for defining the pair of identifiers $B_x$, $C_y$ closest to the pair of identifiers sent $B_1$, $C_1$ are constructed so as to maximize the probability that the corresponding configuration file $D_{x,y}$ is also compatible with the configuration ($B_1$, $C_1$) of terminal 1 even if the configuration of terminal 1 is not strictly identical to the configuration for which configuration file $D_{x,y}$ was created. For example, the concept of proximity may be defined by applying a first rule classifying pairs having a common identifier B ($B_1=B_x$) as being closer to each other than pairs having a common identifier C ($C_1=C_y$), and pairs having a common identifier C being closer to each other than pairs having neither a common identifier B nor a common identifier C. A second rule may then rank (in a more fine-tuned manner) the pairs obtaining a same classification by the application of the first rule. Such a second rule may for example classify pairs as being closest to each other when the two identifiers ($B_1$ and $B_x$, or $C_1$ and $C_x$) correspond to versions from the same developer/manufacturer and/or when their version numbers are close. As a figurative example, the rules may be constructed so that a pair of identifiers $B_1$="gadget_phone_13" and $C_1$="eOS_13.4" is considered closer to the pair of identifiers $B_x$="gadget_phone_13" and $C_y$="eOS_13.3" than to the pair of identifiers $B_x$="G_phone_4"; $C_y$="gOS_4.42". Construction of the rules may vary greatly but remains within the reach of a person skilled in the art and depends on the context of use.

Alternatively, the pre-established rules may be basic, for example constructed to select by default the last pair of identifiers recorded in table II.

At the end of operation 104, an operation 105 is implemented. Operation 105 comprises: sending in return, from server 2 to terminal 1, configuration file $D_{x,y}$ associated with the combination $B_x$, $C_y$ identified according to lookup table II (identified in operation 104).

In the examples described here, file $D_{x,y}$ is sent with an indicator or "tag" (here in the form of a reference "Z") which tags configuration file $D_{x,y}$, Z as "temporary". In other words, the configuration file is identifiable as not yet being validated/final. Another way to say this is that it is a "beta version" of a configuration file.

At the end of operation 105, operations 106 and/or 107-108 are implemented. It should be noted here that operations 106 and 107-108 have no dependency on each other. They may therefore be implemented in parallel with each other or chronologically one after the other in one direction or the other.

Operation 106 comprises:

c. populating database 3 with the set of identifiers received $A_1$, $B_1$, $C_1$ and any association resulting from the identification $B_1$, $C_1$, $D_{x,y}$, Z.

Adding the set of identifiers $A_1$, $B_1$, $C_1$ to list I amounts to recording the connection of terminal 1 at server 2. Thus, if terminal 1 reconnects later on with the same configuration to server 2, implementation of the present methods will lead to situation "i" described above: the process will be terminated so that the communication session continues without updating the configuration of terminal 1. The association $B_1$, $C_1$, $D_{x,y}$, Z is added to lookup table II only if such an association has just been established (in case "iii" above but not in case "ii"). It should be noted here that adding an association pointing to a "temporary" configuration file does not necessarily imply that this association is immediately accessible to future terminals that connect to server 2. This is a design choice that depends on the context: associations involving a configuration file tagged as temporary, and the corresponding configuration file may be hidden or made inaccessible in order to prevent deployment of configuration files that have not yet been validated. Conversely, for example to speed up deployment, associations involving a configuration file tagged as temporary and the corresponding configuration file may be made accessible to other terminals.

Operation 107 comprises:

d. upon receipt of a configuration file $D_{1,1}$; $D_{x,y}$, Z on terminal 1 from server 2, implementing said configuration file in the front-end application (on terminal 1).

By operation 107, the application installed on terminal 1 is not updated as such but its interaction with the hardware layer of terminal 1 is corrected by means of the configuration file. For example, the "raw" control signals from the hardware layer, corresponding for example to an action by the user via the human-machine interface of terminal 1, are better recognized by the application and therefore better translated into software inputs by the application. In the context of PTT communications for example, pressing, holding, and then releasing a physical or virtual button is better recognized as a command for speaking mode.

At the end of operation 107, operation 108 is implemented. Operation 108 comprises:

if and only if the configuration file carries an indicator tagging the file as temporary, switching the front-end application of terminal 1 to a test mode. The test mode allows the user to carry out control tests from his or her terminal without disrupting the functioning of the other terminals.

At the end of operations 107 or 108, the methods for updating the configuration may be considered as terminated: configuration files are in the process of being tested. The user of terminal 1 may perform tests, if necessary with the assistance of an operator. A guided test mode may be integrated into the application. For example, the user may follow instructions for interacting with the human-machine interface of terminal 1 in order to enable the recognition of sequences of human actions. For example, the user may be asked to simulate speaking in a PTT communication channel by pressing, holding for a predefined duration (for example 3 seconds), then releasing a button (physical or virtual) of terminal 1 chosen by the user. The application's registration of control signals from the hardware layer of terminal 1 then allows them to be associated with the correct action or event to be triggered by the software layer (the application), i.e. speaking mode in the above example. When operational, the same user action will therefore be better "recognized" by the application.

The tests carried out by the user aim to verify whether the behavior/operation of the application is correct or not, in order to validate or not validate the temporary configuration file. Optionally, the actions simulated by the user may be stored in order to help correct the temporary configuration file (if certain human actions do not generate the behavior expected of the application).

Examples of tested settings and functions that may be adapted by means of configuration files are given below:

- pressing a physical or virtual button, holding the button down for one or more predetermined durations, then releasing the button at the end of said duration(s), for example to correspond to speaking mode in a PTT communication channel, then the release of the channel;
- briefly pressing a (physical or virtual) button, or a sequence of presses on one or more (physical and/or virtual) buttons, for example to trigger an alert such as sending an "SOS";
- briefly pressing a (physical or virtual) button, or a sequence of presses on one or more (physical and/or virtual) buttons, for example to change from one communication channel to another (function commonly called "switch").
- detecting and adapting to properties specific to terminal 1 relating to the management of audio and/or video streams, in particular the latencies that result from the hardware configuration of terminal 1 which are critical parameters in real-time communications.

A button is mentioned in the examples. However, interface alternatives may be provided, such as movements made on a touch screen.

If the user validates the temporary configuration file ("OK") by an action via the human-machine interface of terminal 1, the update process may continue, for example by implementation of operation 109 described below.

Conversely, if the user does not validate the temporary file, either by a specific action or by an absence of action for a predetermined period, a signal of invalidity ("NOK") of the configuration file may be sent from terminal 1 to server 2. Preferably, the signal of invalidity is accompanied by data from the tests carried out by the user in test mode. Such data may include, for example:

associations between commands from the hardware layer of terminal 1 and the expected behavior of the application; and/or a modified configuration file (partial or complete) determined by the back-end of the application itself.

Depending on the nature of the corrective data sent by terminal 1 to server 2, a corrected configuration file may be generated automatically (by running a corrective module of server 2, without human intervention), or may be created by a human operator accessing the corrective data received on server 2.

The corrected configuration file remains tagged as "temporary" (denoted $D'_{x,y}$,Z in [FIG. 3]) and may be:

sent back to terminal 1 in order to repeat the tests to confirm its validity; and/or added to database 3, replacing the previous version of the configuration file, so as to be made accessible at least to terminal 1, and optionally to other terminals. In the example described here, the corrected configuration file remains tagged as "temporary" until manually validated by an operator. Other validation rules may be implemented, for example validation by a minimum number of users.

An operation 109 comprises:

e. in response to a predetermined validation action by the user via terminal 1, deleting an indicator tagging the file as temporary on terminal 1. In other words, the configuration file becomes definitive/final at the initiative of the user of terminal 1.

An operation 110 comprises:

switching the front-end application to a normal mode. In other words, the temporary test mode is deactivated. The application returns to running normally and in operational mode.

An operation 111 comprises:

sending, from terminal 1 to server 2, a command to validate said temporary configuration file.

Note that operations 109, 110 and 111 are independent and may therefore be implemented in parallel with each other or one after the other in any order.

An operation 112 comprises:

f. upon server 2 receiving from terminal 1 the command to validate the temporary configuration file (after the implementation of operation 111 for example), deleting an indicator tagging the file as temporary in the corresponding association $B_1$, $C_1$, $D_{x,y}$, Z in database 3. Operation 112 may correspond to making the association and the corresponding configuration file available to the other terminals 1 from server 2. In the example described here, operation 112 marks the end of the method for updating the configuration update.

INDUSTRIAL APPLICATION

The methods for updating the configuration have been presented as implemented by terminal 1 and server 2. It will be understood that the methods may take the form of computer programs comprising instructions for implementing the methods when these programs are executed by a processor, respectively of terminal 1 or of server 2. Another object is also the non-transitory computer-readable storage media on which are stored the programs for implementing the methods described herein when these programs are executed by a processor.

The present technical solutions may be applied in particular in a context of maintaining applications of a computer device. They are particularly advantageous when applied to applications for half-duplex communication via mobile telephone networks, in particular because of the wide variety of firmware in circulation in mobile terminals, and also because the interactions between user and terminal in this field are specific (for example, a long press and then release of a button to speak and then to switch to listening mode in a communication channel).

The present disclosure is not limited to the examples of systems, terminals, servers, methods, programs, and program media described above solely as examples, but encompasses all variants that a person skilled in the art may envisage within the context of the protection sought.

LIST OF REFERENCE SYMBOLS

1: Terminal
2: Server
3: Database
101, 102, 103, 104, 105, 106, 107, 108, 109, 110, 111, 112: Operations
I: List
II: Lookup table
A: Terminal identifier
B: Hardware layer identifier
C: Operating system identifier
D: Configuration file
Z: Temporary file tag.

The invention claimed is:

1. A system comprising at least one terminal and a server which are capable of communicating with each other, a back-end application and a corresponding front-end application being installed respectively on the server and on the terminal, the server having access to at least one database comprising:

a list of sets of identifiers, each set of identifiers comprising a terminal identifier, a hardware layer identifier, and an operating system identifier;

a lookup table mapping between each pair of hardware layer identifier and operating system identifier that exists in said list, and a configuration file, stored in the at least one database the terminal and the server being configured in coordination with each other for the following, when a communication session is opened between the terminal and the server:

a. sending, from the terminal to the server, a set of identifiers comprising a terminal identifier, a hardware layer identifier for a hardware layer of the terminal, and an operating system identifier for the operating system implemented on the terminal;

b. upon the server receiving the set of identifiers from the terminal, comparing this set with the content of the database, and in the event of a match between the set of identifiers sent and a set of identifiers in said list, continuing the communication session without updating the configuration of the terminal;

in the event of no match between the set of identifiers sent and the sets of identifiers in said list, and in the event of a match with a pair of hardware layer and operating system identifiers in the lookup table, sending in return, from the server to the terminal, the configuration file associated with said pair in the lookup table;

in the event of no match with a pair of hardware layer and operating system identifiers in the lookup table, identifying, in the lookup table and by applying pre-established rules, a pair of hardware layer and operating system identifiers which is closest to that in the set of identifiers sent from the terminal, then sending in return, from the server to the terminal, the configuration file associated with the combination identified according to the lookup table, said file being sent with an indicator tagging the configuration file as temporary;

c. populating the database with the set of identifiers received and any association resulting from the identification;

d. upon the terminal receiving a configuration file from the server, implementing said configuration file in the front-end application, and if and only if said configuration file carries an indicator tagging the file as temporary, switching the front-end application to a test mode.

2. The system according to claim 1, wherein the terminal and the server are further configured for:

e. in response to a predetermined validation action by the user via the terminal, deleting an indicator tagging the file as temporary, on the terminal, switching the front-end application to a normal mode, sending, from the terminal to the server, a command to validate said temporary configuration file;

f. upon the server receiving from the terminal the command to validate the temporary configuration file, deleting an indicator tagging the file as temporary in the corresponding association in the database.

3. A configuration method implemented by a terminal capable of communicating with a server, a back-end application and a corresponding front-end application being installed respectively on the server and on the terminal, the server having access to at least one database comprising:

a list of sets of identifiers, each set of identifiers comprising a terminal identifier, a hardware layer identifier, and an operating system identifier;

a lookup table mapping between each pair of hardware layer identifier and operating system identifier that exists in said list, and a configuration file, stored in the at least one database the method comprising, upon a communication session being opened between the terminal and the server:

a. sending, from the terminal to the server, a set of identifiers comprising a terminal identifier, a hardware layer identifier for a hardware layer of the terminal, and an operating system identifier for the operating system implemented on the terminal;

d. upon the terminal receiving a configuration file from the server, implementing said configuration file in the front-end application, and if and only if said configuration file carries an indicator tagging the file as temporary, switching the front-end application to a test mode, e. in response to a predetermined validation action by the user via the terminal, deleting an indicator tagging the file as temporary, on the terminal, switching the front-end application to a normal mode, sending, from the terminal to the server, a command to validate said temporary configuration file.

4. A terminal configured for implementing a method according to claim 3.

5. A computer program comprising instructions for implementing the method according to claim 3 when this program is executed by a processor.

6. A non-transitory computer-readable storage medium in which is stored a program for implementing the method according to claim 3 when this program is executed by a processor.

7. A configuration method implemented by a server capable of communicating with at least one terminal, a back-end application and a corresponding front-end application being installed respectively on the server and on the terminal, the server having access to at least one database comprising:

a list of sets of identifiers, each set of identifiers comprising a terminal identifier, a hardware layer identifier, and an operating system identifier;

a lookup table mapping between each pair of hardware layer identifier and operating system identifier that exists in said list, and a configuration file, stored in the at least one database the method comprising, upon a communication session being opened between the terminal and the server:

b. upon the server receiving a set of identifiers from the terminal, comparing this set with the content of the database, and in the event of a match between the set of identifiers sent and a set of identifiers in said list, continuing the communication session without updating the configuration of the terminal;

in the event of no match between the set of identifiers sent and the sets of identifiers in said list, and in the event of a match with a pair of hardware layer and operating system identifiers in the lookup table, sending in return, from the server to the terminal, the configuration file associated with said pair in the lookup table;

in the event of no match with a pair of hardware layer and operating system identifiers in the lookup table, identifying, in the lookup table and by applying pre-established rules, a pair of hardware layer and operating system identifiers which is closest to that in the set of identifiers sent from the terminal, then sending in return, from the server to the terminal, the configuration file associated with the combination identified according to the lookup table, said file being sent with an indicator tagging the configuration file as temporary;

c. populating the database with the set of identifiers received and any association resulting from the identification.

8. The method according to claim 7, further comprising:

f. upon the server receiving from the terminal a command to validate the temporary configuration file, deleting an indicator tagging the file as temporary in the corresponding association in the database.

9. A server configured for implementing a method according to claim 7.

* * * * *